United States Patent
Fenton et al.

(10) Patent No.: US 10,554,247 B1
(45) Date of Patent: Feb. 4, 2020

(54) SYSTEM AND METHOD FOR DEMODULATING CODE SHIFT KEYING DATA FROM A SATELLITE SIGNAL UTILIZING A BINARY SEARCH

(71) Applicant: NovAtel Inc., Calgary (CA)

(72) Inventors: Patrick C. Fenton, Calgary (CA); David Brown, Calgary (CA)

(73) Assignee: NovAtel Inc., Calgary, AB (CA)

( * ) Notice: Subject to any disclaimer, the term of this patent is extended or adjusted under 35 U.S.C. 154(b) by 0 days.

(21) Appl. No.: 16/142,747

(22) Filed: Sep. 26, 2018

(51) Int. Cl.
*H04B 1/709* (2011.01)

(52) U.S. Cl.
CPC ..... *H04B 1/709* (2013.01); *H04B 2201/7073* (2013.01); *H04B 2201/70701* (2013.01)

(58) Field of Classification Search
CPC ... G01S 5/02; G01S 5/14; G01S 19/22; G01S 19/24; G01S 19/27; G01S 19/29; G01S 19/30; G01S 19/36; G01S 19/243; G06F 7/52; G06F 7/58; H04B 1/00; H04B 7/185; H04B 7/707; H04B 7/709; H04B 7/7073; H04H 20/74; H04L 7/04; H04L 27/06; H04L 27/30
USPC .......... 342/357.06, 357.12, 357.63; 375/130, 375/140, 142, 146, 149, 150, 200, 206, 375/209, 219, 295, 316, 343, 360; 455/3.02
See application file for complete search history.

(56) References Cited

U.S. PATENT DOCUMENTS

| | | | |
|---|---|---|---|
| 5,982,807 A | 11/1999 | Snell | |
| 6,313,789 B1 | 11/2001 | Zhodzishsky | |
| 6,424,641 B1 | 7/2002 | Kotov | |
| 6,580,750 B2 | 6/2003 | Aue | |
| 6,687,316 B1 | 2/2004 | McGraw | |
| 6,728,637 B2 | 4/2004 | Ford | |
| 6,888,497 B2 * | 5/2005 | King | G01S 5/0221 342/357.69 |
| 7,082,286 B2 | 7/2006 | Kaewell, Jr. | |

(Continued)

OTHER PUBLICATIONS

Hein, Gunter W. "Code Shift Keying" Inside GNSS, Nov. 19, 2015, 11 pages.

(Continued)

*Primary Examiner* — Shawkat M Ali
(74) *Attorney, Agent, or Firm* — Cesari and McKenna, LLP

(57) ABSTRACT

A Global Navigation Satellite System (GNSS) receiver demodulates code shift keying (CSK) data utilizing a binary search. The GNSS receiver receives a signal including a pseudorandom noise (PRN) code modulated by code shift keying (CSK) to represent a symbol (i.e., CSK modulated symbol). The GNSS receiver maintains a plurality of receiver codes each representing a different shift in chips to the PRN code. The GNSS receiver performs a linear combination of portions of the receiver codes. In an embodiment, the GNSS receiver compares correlation power level value for respective portions of the receiver codes to demodulate the CSK data. In a further embodiment, the GNSS receiver compares the correlation power level values for portions of receiver codes with power detection threshold values to demodulate the CSK data. In a further embodiment, the GNSS receiver utilizes signs of the correlation power level values to demodulate the CSK data.

7 Claims, 12 Drawing Sheets

(56) References Cited

U.S. PATENT DOCUMENTS

| | | | |
|---|---|---|---|
| 7,190,711 B2* | 3/2007 | Keller | H04B 1/70752 375/150 |
| 7,295,635 B2 | 11/2007 | Coatantiec | |
| 7,298,324 B2 | 11/2007 | Manz | |
| 7,298,780 B2 | 11/2007 | Zhengdi | |
| RE40,321 E | 5/2008 | Snell | |
| 7,411,993 B2 | 8/2008 | Sunaga | |
| 7,738,536 B2 | 6/2010 | Fenton | |
| 7,885,317 B2 | 2/2011 | Fenton | |
| 7,916,771 B2 | 3/2011 | Julien | |
| 7,983,323 B2 | 7/2011 | Kent | |
| 8,023,554 B2 | 9/2011 | Kent | |
| 8,189,646 B2 | 5/2012 | Ries | |
| 8,265,126 B2 | 9/2012 | Sanji | |
| 8,279,911 B2 | 10/2012 | Farmer | |
| 8,442,097 B2 | 5/2013 | Fenton | |
| 8,649,415 B2 | 2/2014 | Pratt | |
| 8,675,751 B2 | 3/2014 | Cannon | |
| 8,774,315 B2 | 7/2014 | Cahn | |
| 9,071,342 B1* | 6/2015 | Jin | G01S 19/30 |
| 9,172,524 B2 | 10/2015 | Yoon | |
| 9,306,789 B2 | 4/2016 | Dhayni | |
| 9,331,755 B2 | 5/2016 | Castelain | |
| 9,515,697 B2* | 12/2016 | Raasakka | G01S 19/26 |
| 10,056,937 B1* | 8/2018 | Neff | H04B 1/70735 |
| 10,088,573 B2 | 10/2018 | Wallner | |
| 10,177,950 B2 | 1/2019 | Floch | |
| 2002/0107636 A1 | 8/2002 | Ford | |
| 2003/0036849 A1 | 2/2003 | Ford | |
| 2003/0231580 A1 | 12/2003 | Martin | |
| 2004/0071200 A1 | 4/2004 | Betz | |
| 2004/0196923 A1 | 10/2004 | Feher | |
| 2005/0012664 A1 | 1/2005 | Gerein | |
| 2005/0281318 A1 | 12/2005 | Neugebauer | |
| 2007/0058700 A1 | 3/2007 | Fenton | |
| 2007/0064776 A1 | 3/2007 | Feller | |
| 2008/0212656 A1 | 9/2008 | Feher | |
| 2012/0236905 A1 | 9/2012 | Judd | |
| 2012/0321007 A1 | 12/2012 | Feher | |
| 2013/0021934 A1 | 1/2013 | Rugamer | |
| 2014/0056333 A1 | 2/2014 | Neff | |
| 2014/0191903 A1 | 7/2014 | Vigneau | |
| 2014/0219393 A1 | 8/2014 | Tang | |
| 2015/0338520 A1 | 11/2015 | Boriskin | |
| 2017/0108588 A1 | 4/2017 | Wei | |
| 2017/0285174 A1 | 10/2017 | Zhu | |
| 2017/0366219 A1* | 12/2017 | Kalkunte | H04B 1/70752 |
| 2018/0143328 A1 | 5/2018 | Ries | |
| 2018/0239026 A1* | 8/2018 | Veitsel | G01S 19/243 |
| 2019/0253301 A1 | 8/2019 | Hadaschik | |

OTHER PUBLICATIONS

Suzuki, T., Kubo, N., Takasu, T., "Evaluation of Precise Point Positioning Using MADOC-LEX via Quasi-Zenith Satellite System," *Proceedings of the 2014 International Technical Meeting of the Institute of Navigation*, San Diego, California, Jan. 2014, pp. 460-470.

Axel Javier Garcia Peña, Daniel Salós, Olivier Julien, Lionel Ries, Thomas Grelier. Analysis of the use of CSK for Future GNSS Signals. ION GNSS 2013, 26th International Technical Meeting of the Satellite Division of the Institute of Navigation, Sep. 2013, Nashville, United States. ION, pp. 1461-1479, 2013.

Axel Javier Garcia Peña, Marie-Laure Boucheret, Christophe Macabiau, Jean-Louis Damidaux, Lionel Ries, et al.. Implementation of Code Shift Keying signaling technique in GALILEO E1 signal. NAVITEC 2010, 5th ESA Workshop on Satellite Navigation Technologies and European Workshop on GNSS Signals, Dec. 2010, Noordwijk, Netherlands. pp. 1-8, 2010.

\* cited by examiner

SYSTEM AND METHOD FOR DEMODULATING CODE SHIFT KEYING DATA FROM A SATELLITE SIGNAL UTILIZING A BINARY SEARCH

CROSS-REFERENCE TO RELATED APPLICATIONS

The present application is related to U.S. patent application Ser. No. 16/142,799, which was filed on Sep. 26, 2018 by David Brown and Patrick C. Fenton for "SYSTEM AND METHOD FOR DEMODULATING CODE SHIFT KEYING DATA UTILIZING CORRELATIONS WITH COMBINATIONAL PRN CODES GENERATED FOR DIFFERENT BIT POSITIONS", which is hereby incorporated by reference.

BACKGROUND

Technical Field

The invention relates generally to a Global Navigation Satellite System (GNSS), and more particularly, to a GNSS receiver for demodulating code shift keying (CSK) data from a satellite signal utilizing a binary search.

Background Information

The Quasi-Zenith Satellite System (QZSS) is a Japan-based performance enhancement system for Global Positioning System (GPS) in the Asia-Pacific area. Its L6 signal, e.g., L61 or L62, carries precise GPS/QZSS positioning correction data that, for example, supports Precise Point Positioning (PPP).

The L6 signal is Binary Phase Shift Keying (BPSK) modulated by a pseudo-random noise (PRN) code of length 10230 chips with a rate of 2.5575 Mcps (Million Chips Per Second) repeating every 4 ms. The L6 signal is further modulated by code shift keying (CSK) to represent an 8-bit symbol of an L6 navigation message that is 2000 bits. As such, CSK modulation allows for the transmission of 8-bits during one code period (e.g., 4 ms), and thus allows the L6 navigation message of 2000 bits to be transmitted in 1 second.

Although utilization of CSK modulation is favorable in terms of data transmission rate (e.g., 2 kbps), it puts a computation burden on Global Navigation Satellite System (GNSS) receivers that need to demodulate CSK data (e.g., the 8-bit symbol) from the L6 signal. For example, prior art techniques may perform a brute force implementation that utilizes 256 different correlators, where each correlator is associated with a different PRN shift from 0-255. On each accumulation period of 4 ms, a single correlator corresponding to the L6 signal will have power, and the GNSS receiver determines the CSK data is the PRN shift associated with the correlator that has power.

An alternative prior art technique for demodulating the CSK data is achieved through implementation of Fourier Transforms and Inverse Fourier Transforms. However, these implementations require great hardware, software, and/or computational resources. What is needed is a simpler and more efficient system for demodulating CSK data.

SUMMARY

The inventive system and method demodulates code shift keying (CSK) data from a satellite signal utilizing a binary search. A Global Navigation Satellite System (GNSS) receiver receives one or more satellite signals from one or more GNSS satellites. The satellite signal may be an L6 signal, e.g., L61 or L62, from the Quasi-Zenith Satellite System (QZSS) that includes a 4 ms PRN code (hereinafter "Code 1") of 10230 chips that is modulated by CSK to represent an 8-bit symbol of a L6 navigation message that is 2000 bits. As used herein, "CSK modulated symbol" refers to the 8-bit symbol represented by the PRN code modulated by CSK. The L61 signal may include a 410 ms PRN code (hereinafter "Code 2") of 1048575 chips (i.e., pilot channel) that is modulated by a square wave with a period of 820 ms that is utilized for synchronization purposes, while the L62 signal may include a second data channel.

The GNSS receiver maintains a plurality of receiver codes, where each receiver code represents a different shift in chips to the fundamental PRN code (i.e., the un-shifted PRN code). The total number of receiver codes may be based on the total number of bits (N) of the CSK modulated symbol. Specifically, and because the CSK modulated symbol is a binary representation, the CSK modulated symbol may be any of $2^N$ permutations. For example, and for an 8-bit symbol, the CSK modulated symbol may be any of 256 different permutations ($2^8$=256). Thus, each of the plurality of receiver codes is the fundamental PRN code shifted a different number of chips from 0 to 255 to represent different possible CSK modulated symbols.

The GNSS receiver then generates combinational PRN codes for respective portions (e.g., halves) of the receiver codes. Specifically, the GNSS receiver performs a chip-by-chip summation (i.e., linear combination) of a first portion (e.g., first half) of the receiver codes (e.g., the codes that represent a shift in chips to the fundamental PRN code from 0-127) to generate a first combinational PRN code. In addition, the GNSS receiver performs a chip-by-chip summation of a second portion (e.g., second half) of the receiver codes (e.g., the codes that represent a shift in chips to the fundamental PRN code from 128-255) to generate a second combinational PRN code. Furthermore, the GNSS receiver performs a chip-by-chip summation of respective portions (e.g., halves) of receiver codes down a first hierarchy associated with the first portion of the receiver codes and a second hierarchy associated with the second portion of the receiver codes to produce respective combinational PRN codes.

In an embodiment, the GNSS receiver executes a total number of correlations equal to N times two to demodulate the CSK data. For example, if the CSK modulated symbol is 8-bits, the GNSS receiver executes 16 correlations to demodulate the CSK data. Specifically, the GNSS receiver correlates the received signal, which includes Code 1 modulated by CSK, with the first combinational PRN code to produce a first correlation power level value. The GNSS receiver also correlates the received signal with the second combinational PRN code to produce a second correlation power level value.

If the first correlation power level value is greater than the second correlation power level value, the GNSS receiver correlates the received signal with the combinational PRN codes down the first hierarchy associated with the first portion of the receiver codes to produce correlation power level values that are compared to determine the CSK modulated symbol. The CSK modulated symbol, based on the traversal down the first hierarchy, is a particular value from 0-127 (e.g., 00000000-01111111) and is the demodulated CSK data.

If the first correlation power level value is not greater than the second correlation power level value, the GNSS receiver correlates the received signal with the combinational PRN codes down the second hierarchy associated with the second portion of the receiver codes to produce correlation power level values that are compared to determine the CSK modulated symbol. The CSK modulated symbol, based on the traversal down the second hierarchy, is a particular value from 128-255 (e.g., 10000000-11111111) and is the demodulated CSK data.

In a further embodiment, the GNSS receiver compares the correlation power level values with power detection threshold values using a total of N correlation processes to correlate the received signal with combinational PRN codes. Specifically, if the first correlation power level value is greater than the power detection threshold value based on the expected correlation power, the GNSS receiver correlates the received signal with the combinational PRN codes down the first hierarchy to produce correlation power level values that are compared to the power detection threshold values to determine the CSK modulated symbol. The CSK modulated symbol, based on the traversal down the first hierarchy, is a particular value from 0-127 (e.g., 00000000-01111111) and is the demodulated CSK data.

If the first correlation power level value is not greater than the power detection threshold value based on the expected correlation power, the GNSS receiver correlates the received signal with the combinational PRN codes down the second hierarchy to produce correlation power level values that are compared to the power detection threshold values to determine the CSK modulated symbol. The CSK modulated symbol, based on the traversal down the second hierarchy, is a particular value from 128-255 (e.g., 10000000-11111111) and is the demodulated CSK data.

In a further embodiment, the combinational PRN codes may be generated based on a chip-by chip summation of a first portion (e.g., first half) of the receiver codes and a chip-by-chip subtraction (i.e., linear combination) of a second portion (e.g., second half) of the receiver codes. For example, a first combinational PRN code for receiver codes 0-255 may be generated based on a chip-by-chip summation of receiver codes 0-127 and a chip-by-chip subtraction of receiver codes 128-255. The GNSS receiver also performs a chip-by-chip summation and a chip-by-chip subtraction for respective portions (e.g., halves) of receiver codes down a first hierarchy associated with the first portion of the receiver code to produce respective combinational PRN codes. Further, the GNSS receiver also performs a chip-by-chip summation and a chip-by-chip subtraction for respective portions (e.g., halves) of receiver codes down a second hierarchy associated with the second portion of the receiver codes to produce respective combinational PRN codes.

The GNSS receiver correlates the received signal with the first combinational PRN code to produce a first correlation power level value. If the correlation power is positive (i.e., +), the GNSS receiver correlates the received signal with the combinational PRN codes down the first hierarchy to produce correlation power level values. The signs (e.g., positive or negative) of the produced correlation power level values based on the traversal down the first hierarchy are utilized to determine the CSK modulated symbol. The CSK modulated symbol, based on the traversal down the first hierarchy, is a particular value from 0-127 (e.g., 00000000-01111111) and is the demodulated CSK data.

If the correlation power is negative (i.e., −), the GNSS receiver correlates the received signal with the combinational PRN codes down the second hierarchy to produce correlation power level values. The signs (e.g., positive or negative) of the produced correlation power level values based on the traversal down the second hierarchy are utilized to determine the CSK modulated symbol. The CSK modulated symbol, based on the traversal down the second hierarchy, is a particular value from 128-255 (e.g., 10000000-11111111) and is the demodulated CSK data.

The GNSS receiver may demodulate the CSK data from 250 consecutive L6 4 ms signal sample sets to determine the binary value of the entire L6 message that is 2000 bits. The demodulated L6 message may then be utilized by the GNSS receiver for Precise Point Position (PPP) or for any of a variety of different accurate positioning techniques, as known by those skilled in the art.

Advantageously, the inventive system and method leverages the low cross correlation accumulations of PRN codes. As known by those skilled in the art, cross correlations are produced when a PRN code is correlated with a shifted version of itself. The expected value of a cross correlation of a 10230 chip PRN code is zero with a standard deviation related to the number of chips in the PRN code. By definition, the value of each chip (e.g., +1 or −1) of a PRN code is random with respect to all of its neighbors. Therefore, the PRN code's correlation noise behavior can be estimated by the Central Limits Theorem. According to the Central Limits Theorem, the variance of an accumulation can be estimated by the sum of the individual sample variances. The variance of each PRN chip by definition is 1, thus the variance of a cross correlation sum of 10230 chips is 10230. Therefore, the standard deviation of the correlation is approximately 101 (e.g., sqrt(10230)), whereas the expected value of an in-phase correlation of the PRN code is 10230.

A correlation accumulation of a modulated signal with a locally generated PRN code that is perfectly aligned or in-phase with the modulated signal will produce a value that is approximately 100 times higher than a correlation accumulation of the same received signal with a PRN code not in-phase (out-of-phase). Therefore, if a PRN code in several different phases (e.g., shifted various chips) are combined and then correlated with a signal, the correlation accumulation will be higher (e.g., approximately 100 times higher) if the phase of the received signal lines up with a phase of one of the PRN codes in the combination. That is, the correlation accumulation of a signal lining up in phase with one of the PRN codes in the combination will be approximately 100 times higher than the correlation accumulation of the signal not lining up in phase with any of the PRN codes in the combination.

Further, the base accumulation noise level will increase with the number of PRN codes combined together for the correlation. The expected increase of the base noise level will increase by sqrt(K), where K is the number of PRNs combined together. For example, if 128 different phases of a 10230 PRN code are combined together, the base noise level would be expected to increase by approximately 11.3 (sqrt(128)) to produce an expected noise floor of approximately 1144 (sqrt(10230)*sqrt(128)). This is still 10 times lower than the expected power level of an in-phase correlation (e.g., 10230) if any of the 128 PRN codes in the combination lines up with the phase of the signal.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
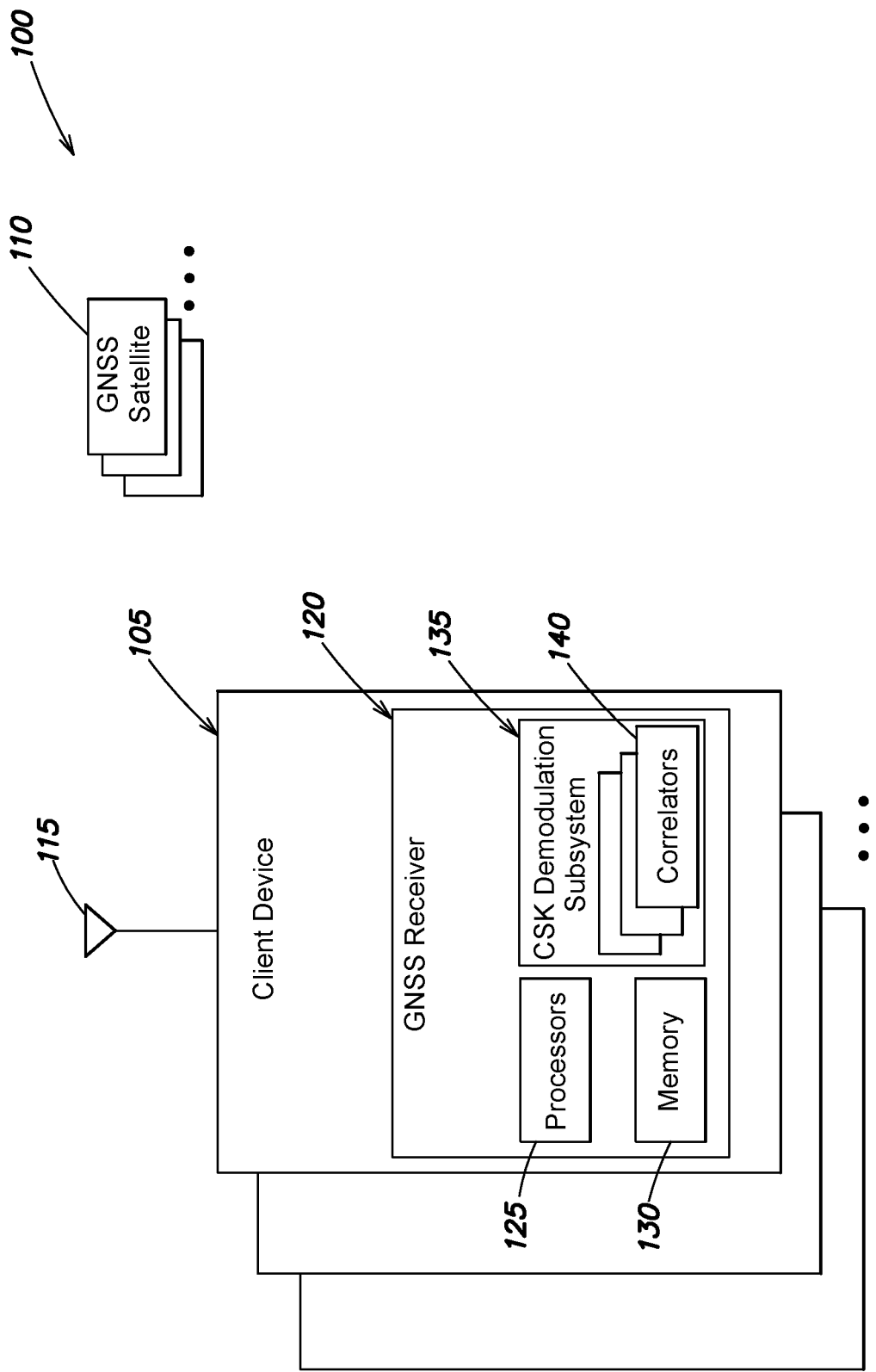
FIG. 1 depicts a system in accordance with an illustrative embodiment of the invention.

Referring to FIG. 1, a system 100 includes one or more client devices 105 and one or more Global Navigation Satellite System (GNSS) satellites 110 that transmit one or more GNSS satellite signals (not shown). The GNSS satellites 110 may be associated with one or more satellite navigation system such as, but not limited to, Galileo, Quasi-Zenith Satellite System (QZSS), BeiDou Navigation Satellite System (BDS), Global Positioning System (GPS), and/or GLONASS.

The client device 105 is typically capable of moving and includes an antenna 115 and a GNSS receiver 120, with one or more processors 125 and a memory 130. For example, the client device 105 may be a cellphone, laptop computer, portable computer, a personal digital assistant, etc. In addition, the GNSS receiver 120 may be a single, dual, or multi-frequency receiver.

The one or more processors 125 execute a code shift keying (CSK) demodulation subsystem 135, which includes one or more correlators 140, to demodulate CSK data from a satellite signal received at antenna 115 according to one or more embodiments described herein. Each of the plurality of correlators 140 may be a multi-bit or a single bit pseudo-random noise (PRN) correlator.

In an embodiment, the CSK demodulation subsystem 135 compares correlation power level values for respective portions (e.g., halves) of receiver codes to demodulate the CSK data, as will be described in further detail below. As such, and in an embodiment, a total number of correlation processes equal to twice the number of bits (N) of the CSK modulated symbol is required to demodulate the CSK data. For example, the CSK demodulated subsystem 135 will execute a total of 16 correlation processes to demodulate the 8-bit symbol from the L6 signal.

In a further embodiment, the CSK demodulation subsystem 135 compares correlations power level values for portions (e.g., halves) of receiver codes with power detection threshold values to demodulate the CSK data, as will be described in further detail below. As such, and in this further embodiment, a total number of correlation processes is equal to N is required to correlate the received signals with the combinational PRN codes. In addition, an additional correlation process may be utilized to calculate the power detection threshold value. Thus, the CSK demodulated subsystem 135 utilizes a total N plus one correlation processes to demodulate the CSK data. In a further embodiment, the CSK demodulation subsystem 135 utilizes the signs of correlations power level values to demodulate the CSK data, as will be described in further detail below. As such, and in this embodiment, a total number of correlation processes equal to N is required to demodulate the CSK data.

The one or more processors 125 calculate position utilizing information from the GNSS signals (the timing of codes and carriers in the GNSS signals) received at the antenna 115 in conjunction with the demodulated CSK data to mitigate errors (e.g., orbit, clock, atmosphere, and/or multipath errors), resulting in the calculation of decimeter-level or better positioning accuracy. For example, the one or more processors 125 may demodulate CSK data (e.g., an 8-bit symbol) from 250 consecutively received L6 4 ms signal sample sets to construct a message, e.g., an L6 navigation message that is 2000 bits, which may be utilized with an accurate positioning technique (e.g., Precise Point Positioning (PPP)).

The memory 130 may store one or more values associated with one or more embodiments described herein. For example, the memory 130 may store the fundamental PRN codes, where each fundamental PRN code is associated with a different GNSS satellite from which the GNSS receiver 120 receives satellite signals. In addition, the memory 130 may store receiver codes, the combinational PRN codes, correlation power level values, power detection threshold values, and one or more other values associated with the one or more embodiments described herein.

Figure 2:
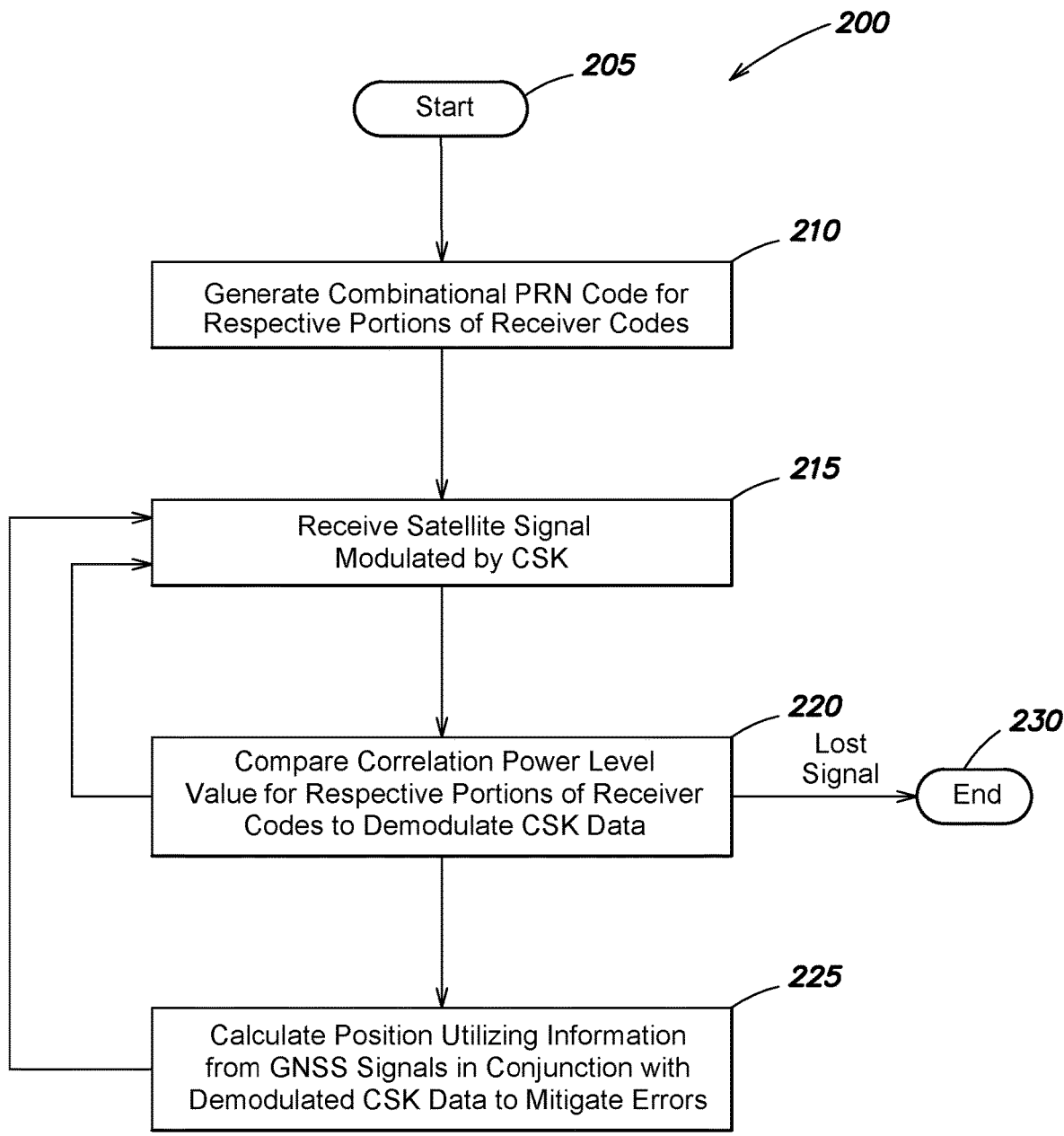
FIG. 2 is an exemplary flow chart for demodulating CSK data utilizing a binary search by comparing correlation power level values for respective portions of receiver codes in accordance with an illustrative embodiment of the invention.

FIG. 2 is an exemplary flow chart for demodulating CSK data from a satellite signal utilizing a binary search by comparing correlation powers level values for respective portions of receiver codes in accordance with an illustrative embodiment of the invention. It should be understood that fewer or additional steps may be performed, and the steps may be performed in a different order.

The procedure 200 starts at step 205 and continues to step 210 where a CSK demodulation subsystem 135 generates combinational PRN codes for respective portions of the receiver codes. Specifically, the GNSS receiver 120 may maintain, in memory 130, a plurality of receiver codes, where each receiver code represents a different shift in chips to the fundamental PRN code. In this example, the CSK modulated symbol is 8-bits (N=8). As such, each of the plurality of receiver codes is the fundamental PRN code shifted a different number of chips from 0 to 255 to represent different possible CSK modulated symbols.

Specifically, the fundamental PRN code corresponds to the CSK modulated symbol of 00000000. The fundamental PRN code shifted one chip to the left is the receiver code that corresponds to the CSK modulated symbol of 00000001, the fundamental PRN code shifted two chips to the left is the receiver code that corresponds to the CSK modulated symbol of 00000010, etc. The fundamental PRN code shifted 255 chips to the left is the receiver code that corresponds to the CSK modulated symbol of 11111111.

The CSK demodulation subsystem 135 then performs a chip-by-chip summation (i.e., linear combination) of respective portions (e.g., halves) of the receiver codes to generate the combinational PRN codes. Specifically, the CSK demodulation subsystem 135 performs a chip-by-chip summation of receiver codes 0-127, which correspond to the fundamental PRN code (e.g., the PRN code un-shifted) through the fundamental PRN code shifted 127 chips to the left. The chip-by-chip summation of receiver codes 0-127 produces a first combinational PRN code. In addition, the CSK demodulation subsystem 135 performs a chip-by-chip summation of receiver codes 128-255, which corresponds to the fundamental PRN code shifted 128 chips to the left through the fundamental PRN code shifted 255 chips to the left. The chip-by-chip summation of receiver codes 128-255 produces a second combinational PRN code.

Further, the CSK demodulation subsystem 135 generates combinational PRN codes for respective portions (e.g., halves) of receive codes down a first hierarchy associated with receiver codes 0-127 and a second hierarchy associated with receiver codes 128-255.

Figure 3A:
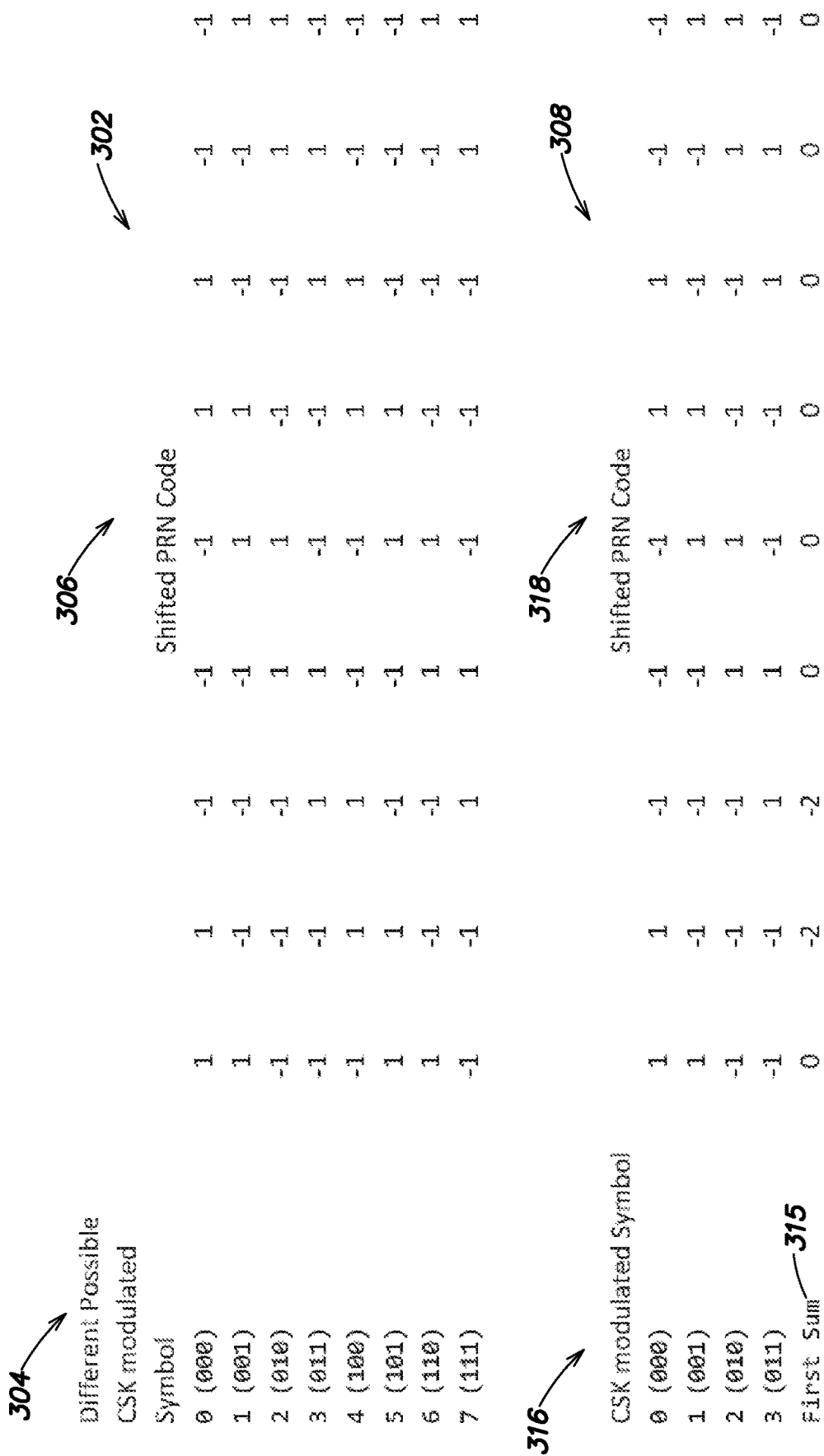
FIG. 3A-3C depicts exemplary tables for generating combinational PRN codes for respective portions of receiver codes in accordance with an illustrative embodiment of the invention.
Figure 3B:
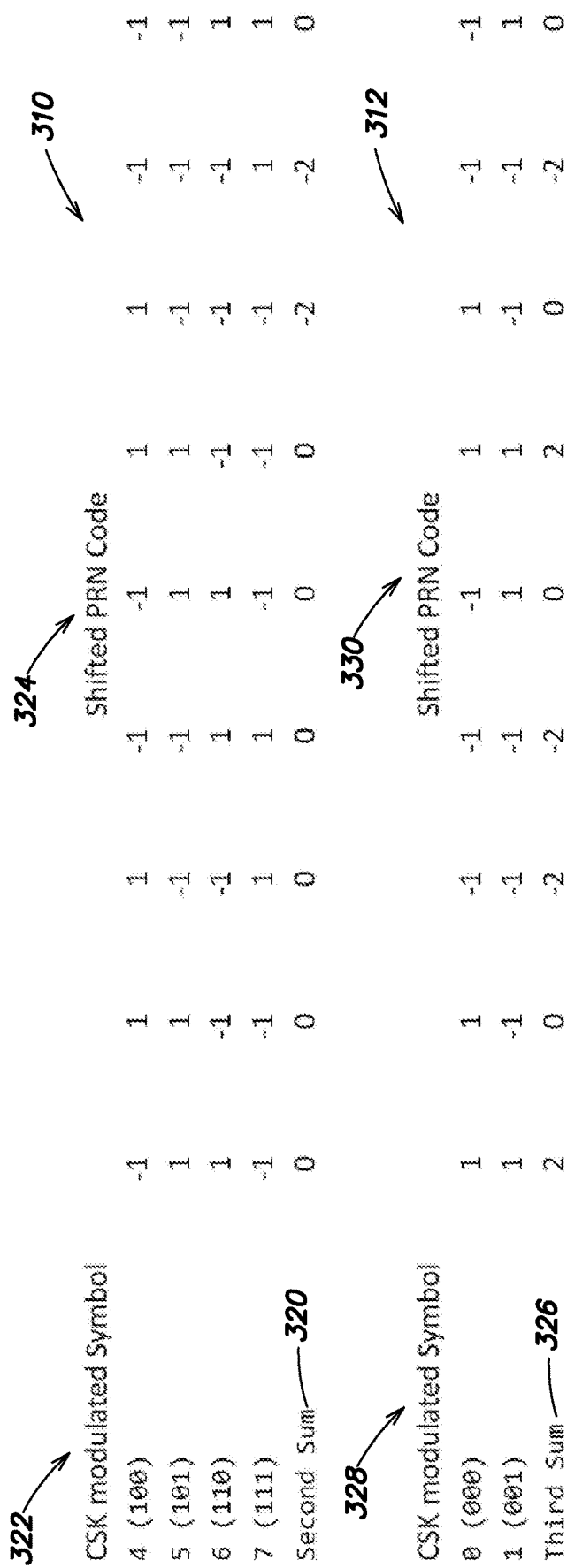
Figure 3C:
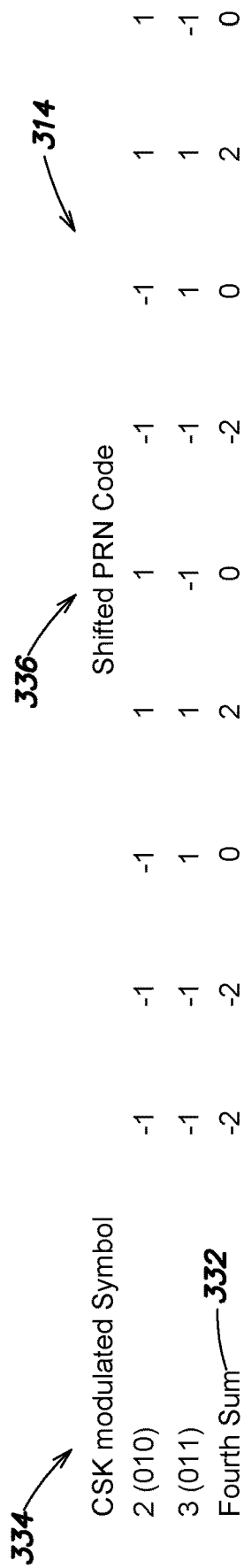

FIGS. 3A-3C are exemplary tables for generating combinational PRN codes for respective halves of receiver codes in accordance with an illustrative embodiment of the invention. For simplicity purposes, the symbol utilized for FIGS. 3A-3C is three bits and the PRN code is 9 chips. However, it is expressly contemplated that the technique described herein for generating combinational PRN codes may be utilized for a symbol having any number of bits and a PRN code having any number of chips. For example, the technique described herein may be utilized with an 8-bit CSK modulated symbol and a PRN code that is 10230 chips.

Specifically, the first table 302 includes column 304 entitled different possible CSK modulated symbol. Each of the eight rows in column 304 includes a different possible permutation of the CSK modulated symbol. Specifically, and because the symbol is 3 bits, there are eight different possible permutations of the CSK modulated symbol.

The first table 302 further includes a second column 306 entitled shifted PRN code. The first row of column 306 includes the fundamental PRN code and corresponds to CSK modulated symbol of 000. The second row of column 306 includes a receiver code that is the fundamental PRN code shifted one chip to the left and corresponds to the CSK modulated symbol of 001. The third row of column 306 includes a receiver code that is the fundamental PRN code shifted two chips to the left and corresponds to the CSK modulated symbol of 010. Rows four through eight of column 306 include different receiver codes, e.g., the fundamental PRN code shifted three through seven chips to the left, that respectively correspond to CSK modulated symbols of 011 through 111 as depicted in FIG. 3A.

FIGS. 3A-3C further include tables 308, 310, 312, and 314 that respectively depict the generation of the combinational PRN codes that are generated for respective halves of the receiver codes.

Table 308 is a subset of table 302 and contains the first half of the rows of table 302, i.e., 0, 1, 2, and 3. As depicted in table 308, the PRN codes shifted from zero to three chips to the left are summed together in a chip-by-chip manner to generate a first combinational PRN code 315. Column 316 and column 318 of table 308 respectively include the first half of the CSK modulated symbols and the associated PRN code shifted various chips.

Table 310 is a subset of table 302 and contains the second half of the rows of table 302, i.e., 4, 5, 6, and 7. As depicted in table 310, the PRN codes shifted from four to seven chips to the left are summed together in a chip-by-chip manner to generate a second combinational PRN code 320. Column 322 and column 324 of table 310 respectively include the second half of the CSK modulated symbols and the associated PRN code shifted various chips.

Table 312 is a subset of table 308 and contains a first half of the rows of table 308, i.e., 0 and 1. As depicted in table 312, the PRN codes shifted zero and one chip to the left are summed together in a chip-by-chip manner to generate a third combinational PRN code 326. Column 328 and column 330 of table 312 respectively include the first half of the CSK modulated symbols from table 308 and the associated PRN code shifted various chips.

Table 314 is a subset of table 308 and contains a second half of the rows of table 308, i.e., 2 and 3. As depicted in table 314, the PRN codes shifted two and three chips to the left are summed together in a chip-by-chip manner to generate a fourth combinational PRN code 332. Column 334 and column 336 of table 314 respectively include the second half of the CSK modulated symbols from table 308 and the associated PRN code shifted various chips. Although not shown in the tables, combinational PRN codes are generated for the second half of receiver codes, e.g., a combinational PRN code for receiver codes 4 and 5 and a combinational PRN code for receiver codes 6 and 7.

It is noted that the chip values as depicted in FIGS. 3A and 3B are either 1 or −1 and for the combinational PRN codes described herein, the chip values depend on how many codes are being summed together. In the example of FIGS. 3A & 3B, where four PRN codes are being added together (N=3), each chip of the combinational code may vary between −4 and −4. Whereas if 128 different codes were added together, in the case of N=8, the chip values of the combinational code may range from −128 to 128. Although the chip values for the combinational PRN codes may be multiple bits in length and range from a value of −128 to 128, in a further embodiment, the combinational PRN codes may be reduced to a single bit. For example, the "sign" function (e.g., + or −) on the −128 to +128 values may be utilized to reduce the combinational PRN code to the single bit. This further embodiment would result in decreased performance, but simpler hardware, e.g., utilizing single bit PRN correlators.

Figure 3D:
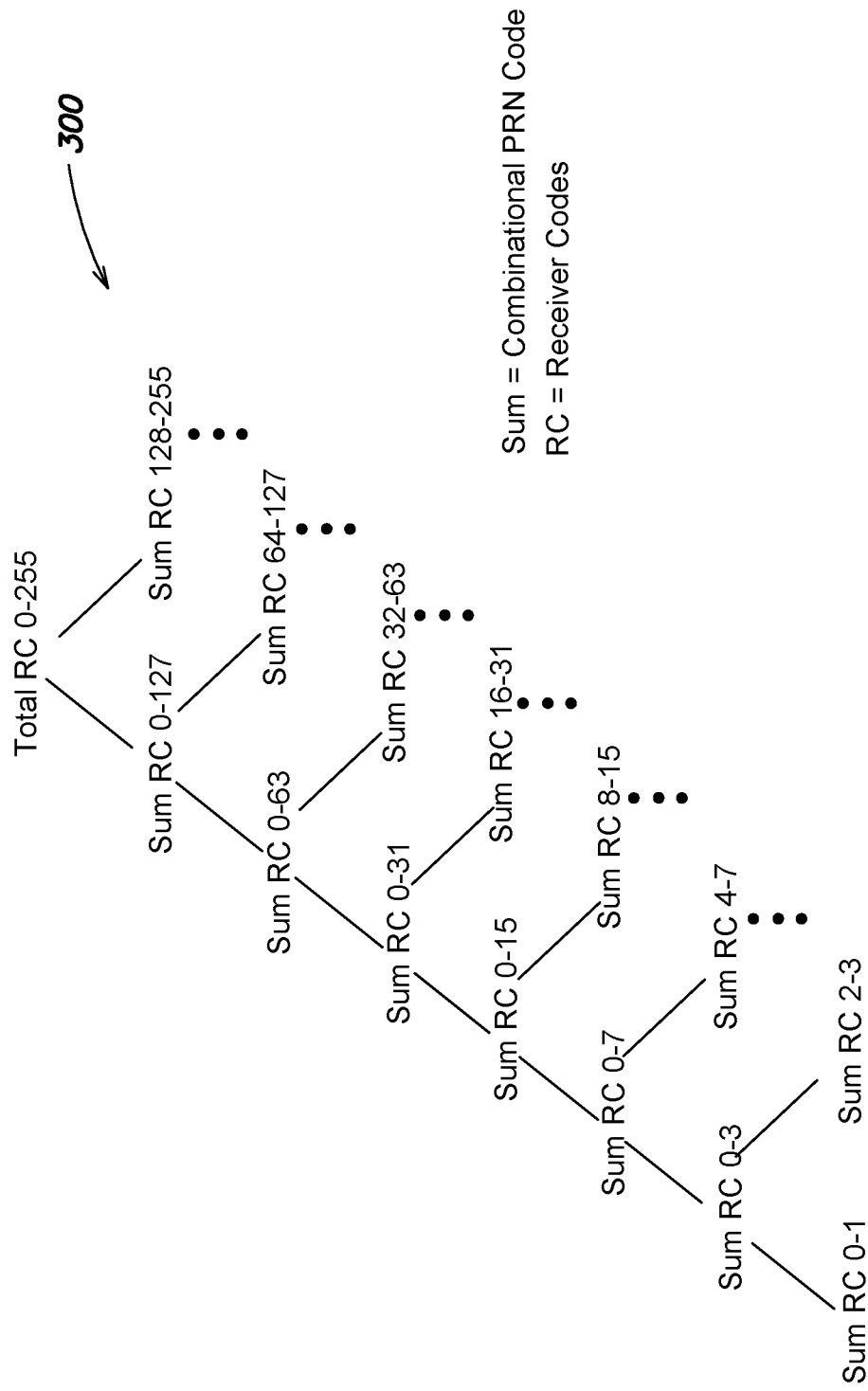
FIG. 3D depicts an exemplary summing tree for the combinational PRN codes generated for respective portions of receiver codes in accordance with an illustrative embodiment of the invention.

FIG. 3D is an exemplary summing tree for the combinational PRN codes generated for respective halves of receiver codes in accordance with an illustrative embodiment of the invention. Specifically, and for an 8-bit symbol (N=8), a first combinational PRN code is generated for receiver codes 0-127 by performing a chip-by-chip summation of receiver codes 0-127. Similarly, a second combinational PRN code is generated for receiver codes 128-255 by performing a chip-by-chip summation of receiver codes 128-255. In additional, and as depicted in FIG. 3D, combinational PRN codes are generated for respective halves of receiver codes down a first hierarchy associated with the first half of receiver codes and down a second hierarchy associated with the second half of receiver codes.

The procedure continues to step 215 where a GNSS receiver 120, at a client device 105, receives a satellite signal that is modulated by CSK. The satellite signal may be a L6 signal that includes Code 1 of 10230 chips that is modulated by CSK to represent an N bit symbol. If the L6 signal is a L61 signal, it may also include Code 2 (e.g., pilot channel). If the L6 signal is a L62 signal, it may include an additional data channel. As such, an entire L6 navigation message of 2000 bits can be transmitted from the GNSS satellite 110 to the GNSS receiver 120 in 1 second. For this example, let it be assumed that the N bit symbol where N=8, i.e., the CSK modulated symbol, is 00000011 (i.e., a binary representation of 3).

The procedure continues to step 220 where the CSK demodulation subsystem 135 compares correlation power level values for respective portions (e.g., halves) of receiver codes to demodulate the CSK data. Specifically, the received signal is correlated with the first combinational PRN code stored in memory 130 to produce a first correlation power level value. In addition, the received signal is correlated with the second combinational PRN code stored in memory 130 to produce a second correlation power level value.

Figure 4:
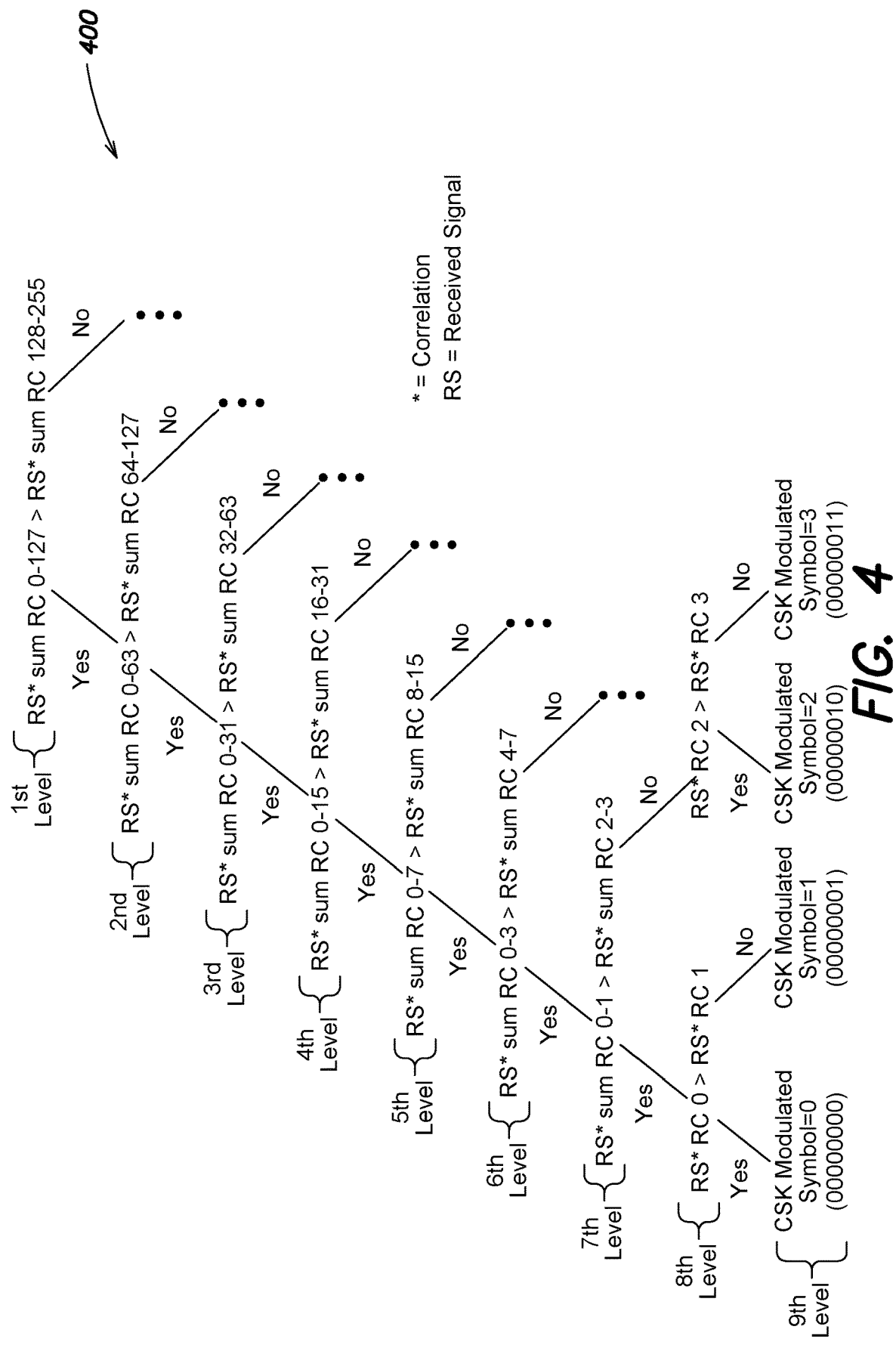
FIG. 4 depicts a binary search tree using correlation power level values for respective portions of receiver codes to demodulate CSK data in accordance with an illustrative embodiment of the invention.

Specifically, and as depicted in FIG. 4, the CSK demodulation subsystem 135 utilizes a correlator of the one or more correlators 140 to correlate the received signal, which includes Code 1 modulated by CSK, with the first combinational PRN code generated for the first half of the receiver codes (0-127) to produce a first correlation power level value. For example, the correlation may be the dot product of Code 1 modulated by CSK with the first combinational PRN code. The CSK demodulation subsystem 135 also uses a correlator of the one or more correlator 140 to correlate the received signal with the second combinational PRN code generated for the second half of the receiver codes (128-255) to produce a second correlation power level value.

The CSK demodulation subsystem 135 may compare the first correlation power level value and the second correlation power level value to a threshold value to determine if a signal is present. If the first correlation power level value and the second correlation power level value are not greater than the threshold value, the signal is determined to be lost or not present and the procedure ends at step 230. It is noted that the threshold value may, for example, be set by a user or determined in any of a variety of different ways.

If the signal is determined to be present, the CSK demodulation subsystem 135 compares the first correlation power level value to the second correlation power level value. If the first correlation power level value is greater than the second correlation power level value, the CSK demodulation subsystem 135 performs additional correlations, utilizing the one or more correlators 140, to correlate the received signal with the combinational PRN codes down a first hierarchy associated with the first portion (e.g., half) of the receiver codes to produce correlation power level values that are compared to determine the CSK modulated symbol. The CSK modulated symbol, based on the traversal down the first hierarchy, is a particular value from 0-127 (e.g., 00000000-01111111) and is the demodulated CSK data.

If the first correlation power level value is not greater than the second correlation power level value, the CSK demodulation subsystem 135 performs additional correlations, utilizing the one or more correlators 140, to correlate the received signal with the combinational PRN codes down the second hierarchy associated with the second portion (e.g., half) of the receiver codes to produce correlation power level values that are compared to determine the CSK modulated symbol. The CSK modulated symbol, based on the traversal down the second hierarchy, is a particular value from 128-255 (e.g., 10000000-11111111) and is the demodulated CSK data.

FIG. 4 illustrates a binary search tree 400 using correlation power level values for respective portions of receiver codes to demodulate CSK data in accordance with an illustrative embodiment of the invention. Specifically, the CSK demodulation subsystem 135 utilizes a correlator of the one or more correlator 140 to correlate the received signal with the first combinational PRN code to produce the first correlation power level value. In addition, the CSK demodulation subsystem 135 utilizes a correlator of the one or more correlator 140 to correlate the received signal with the second combinational PRN code to produce the second correlation power level value as depicted in the first level of the binary search tree 400.

The CSK demodulation subsystem 135 then determines if the first correlation power level value is greater than the second correlation power level value. In this example, the first correlation power level value is greater than the second correlation power level value.

Therefore, the CSK demodulation subsystem 135 traverses the binary search tree 400 down the first hierarchy to the second level. If the first correlation power level value was not greater than the second correlation power level value, the CSK demodulation subsystem 135 would traverse the binary search tree 400 down the second hierarchy, associated with receiver codes 128-255, to the second level.

The CSK demodulation subsystem 135 performs a third correlation process, utilizing a correlator of the one or more correlators 140, to correlate the received signal with a third combinational PRN code generated for receiver codes 0-63 to produce a third correlation power level value. In addition, the CSK demodulation subsystem 135 performs a fourth correlation process, utilizing a correlator of the one or more correlators 140, to correlate the received signal with a fourth combinational PRN code generated for receiver codes 64-127 to produce a fourth correlation power level value. The CSK demodulation subsystem 135 then determines if the third correlation power level value is greater than the fourth correlation power level value. In this example, the third correlation power level value is greater than the fourth correlation power level value.

The CSK demodulation subsystem 135 continues to traverse the binary search tree 400 down the first hierarchy, based on the comparison of correlation power level values as described above and utilizing additional correlation processes, to reach the bottom level (i.e., the ninth level) to determine the CSK modulated symbol. In this example, the CSK demodulation subsystem 135 traverses the first hierarchy and determines that the correlation power level value produced based on the correlation of the received signal with receiver code two is not greater than the correlation power level value produced based on the correlation of the received signal with receiver code three. As such, the CSK modulated symbol is determined to be three. Therefore, the CSK demodulation subsystem 135 determines that the 8-bit symbol represented by Code 1 modulated by CSK is 00000011 (i.e., a binary representation of 3).

Advantageously, the inventive system and method utilizes N times two, e.g., 16, correlation processes to demodulate the CSK data.

From step 220, the procedure may continue to step 215 where the GNSS receiver 120 receives additional signals and demodulates the CSK data from 250 consecutive L6 4 ms signal sample sets, in the manner described above, to determine the binary value of an entire L6 message that is 2000 bits. Specifically, the GNSS receiver 120 may utilize the generated combinational PRN codes, stored in memory 130, every 4 ms to demodulate the CSK data from 250 consecutive L6 signal sample sets in the manner described above.

Alternatively, from step 220, the procedure may continue to step 225 where the one or more processors 125, of the GNSS receiver 120, calculate position utilizing information from the GNSS signals (e.g., the timing of codes and carriers in the GNSS signals) received at the antenna 115 in conjunction with the demodulated CSK data to mitigate errors (e.g., orbit, clock, atmosphere, and/or multipath errors). For example, the one or more processors 125 may utilize the L6 message of 2000 bits and demodulated from the 250 consecutive L6 signals to implement PPP or any of a variety of different accurate positioning techniques, thus resulting in the calculation of decimeter-level or better positioning accuracy as known by those skilled in the art.

The procedure then continues to step 215 where the receiver 120 may receive additional signals, and demodulates the CSK data and determines position in the manner described above. For example, and after one second and demodulating the entirety of the L6 message, the GNSS receiver may receive additional signals and demodulate the CSK data and determine position in the manner described above.

It is noted that utilizing respective halves of the receiver codes is for exemplary purposes only, and it is expressly contemplated that the combinational PRN codes may be generated based on the receiver codes being divided in any of a variety of different ways. For example, a first combinational PRN code may be generated for ¼ of the receiver codes (e.g., receiver codes 0-63) and a second combinational PRN code may be generated for the other ¾ of the receiver codes (e.g., receiver codes 64-255). The CSK demodulation subsystem 135 would then correlate the received signal with the first combinational PRN code and the second combinational PRN code to produce respective first and second correlation power level value.

If the first correlation power level value is greater than the second correlation power level value, the CSK demodulation subsystem 135 correlates the received signal with combinational PRN codes down a first hierarchy associated with receiver codes 0-63, in the manner described above, to determine the CSK modulated symbol. The CSK modulated symbol, based on the traversal down the first hierarchy, is a particular value from 0-63 (e.g., 00000000-00111111).

If the first correlation power level value is not greater than the second correlation power level value, the CSK demodulation subsystem 135 correlates the received signal with combinational PRN codes down a second hierarchy associated with receiver codes 64-255, in the manner described above, to determine the CSK modulated symbol. The CSK modulated symbol, based on the traversal down the second hierarchy, is a particular value from 64-255 (e.g., 01000000-11111111).

Thus, the CSK demodulation may utilize any of a variety of partitioning algorithms to divide the receiver codes in a hierarchical manner to demodulate the CSK data in the manner described above. For example, such partitioning algorithms may include, but are not limited to, a golden-section schema or any of a variety of different schemes, as known by those skilled in the art.

Figure 5:
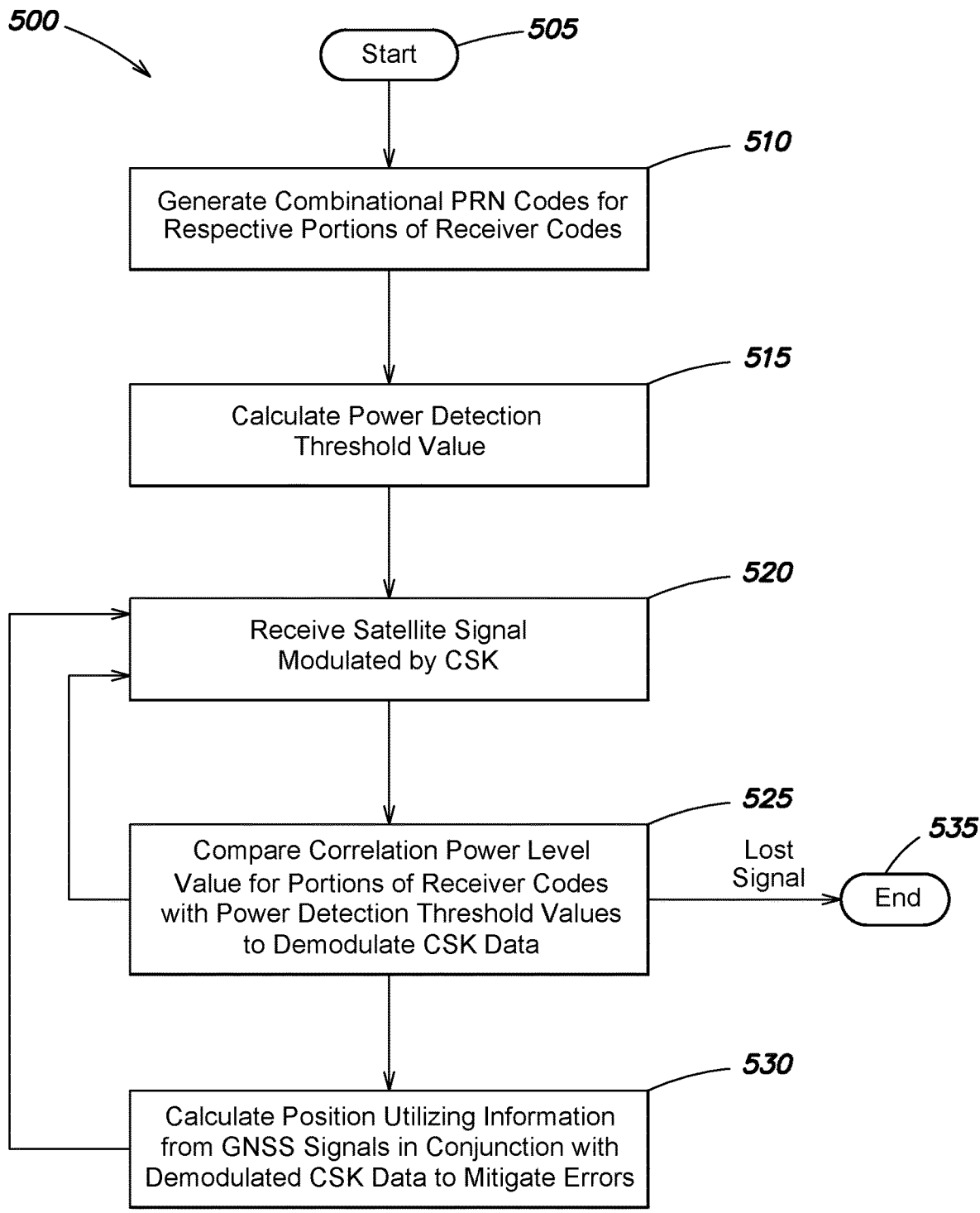
FIG. 5 is an exemplary flow chart for demodulating CSK data utilizing a binary search by comparing correlation power level values for portions of receiver codes with power detection threshold values in accordance with an illustrative embodiment of the invention.

FIG. 5 is an exemplary flow chart for demodulating CSK data from a satellite signal utilizing a binary search by comparing correlation power level values for portions of receiver codes with power detection threshold values in accordance with an illustrative embodiment of the invention. It should be understood that fewer or additional steps may be performed, and the steps may be performed in a different order.

The procedure 500 starts at step 505 and continues to step 510 where a CSK demodulation subsystem 135 generates combinational PRN codes for respective portions of the receiver codes. Specifically, and where N=8, the GNSS receiver 120 may maintain a plurality of different receiver codes and the CSK demodulation subsystem 135 may perform a chip-by-chip summation of portions (e.g., halves) of receiver codes to generate the combinational PRN codes as described above with reference to FIGS. 2 and 3A-3D.

The procedure continues to step 515 where the CSK demodulation subsystem 135 calculates a power detection threshold value. If the L6 signal is an L61 signal, the power threshold value may be based on a measured carrier-to-noise (C/N) ratio. Specifically, and after the pilot channel has been phase locked, the CSK demodulation subsystem 135 may measure the C/N ratio of the pilot channel. The CSK demodulation subsystem 135 may then divide the measured power of the pilot channel by two to produce the power detection threshold value (e.g., original power threshold value).

If the L6 signal is an L62 signal which does not include the pilot channel, the power detection threshold value may be based on the fundamental PRN code (i.e., the un-shifted PRN code). Specifically, a correlator of the one or more correlators 140 may be utilized for the fundamental PRN code (i.e., the un-shifted PRN code). The CSK demodulation subsystem 135 may measure the power level associated with the correlator utilized for the fundamental PRN code, and the power level may be divided by two to produce the power detection threshold value. It is noted that a single multiplexed correlator may be utilized to correlate the received signal with the combinational PRN codes and to also calculate the power detection threshold value. Alternatively, a plurality of correlators, of the one or more correlators 140, may be utilized to correlate the received signal with the combinational PRN codes and to also calculate the power detection threshold value.

The procedure continues to step 520 where a GNSS receiver 120, at a client device 105, receives a satellite signal that is modulated by CSK. The satellite signal may be an L6 signal that includes Code 1 of 10230 chips that is modulated by CSK to represent an N bit symbol. If the L6 signal is an L61 signal, it may also include Code 2 (e.g., pilot channel). If the L6 signal is an L62 signal, it may include an additional data channel. As such, an entire L6 navigation message of 2000 bits can be transmitted from the GNSS satellite 110 to the GNSS receiver 120 in 1 second. For this example, let it be assumed that the N bit symbol where N=8, i.e., the CSK modulated symbol, is 00000001 (i.e., a binary representation of 1).

Figure 6:
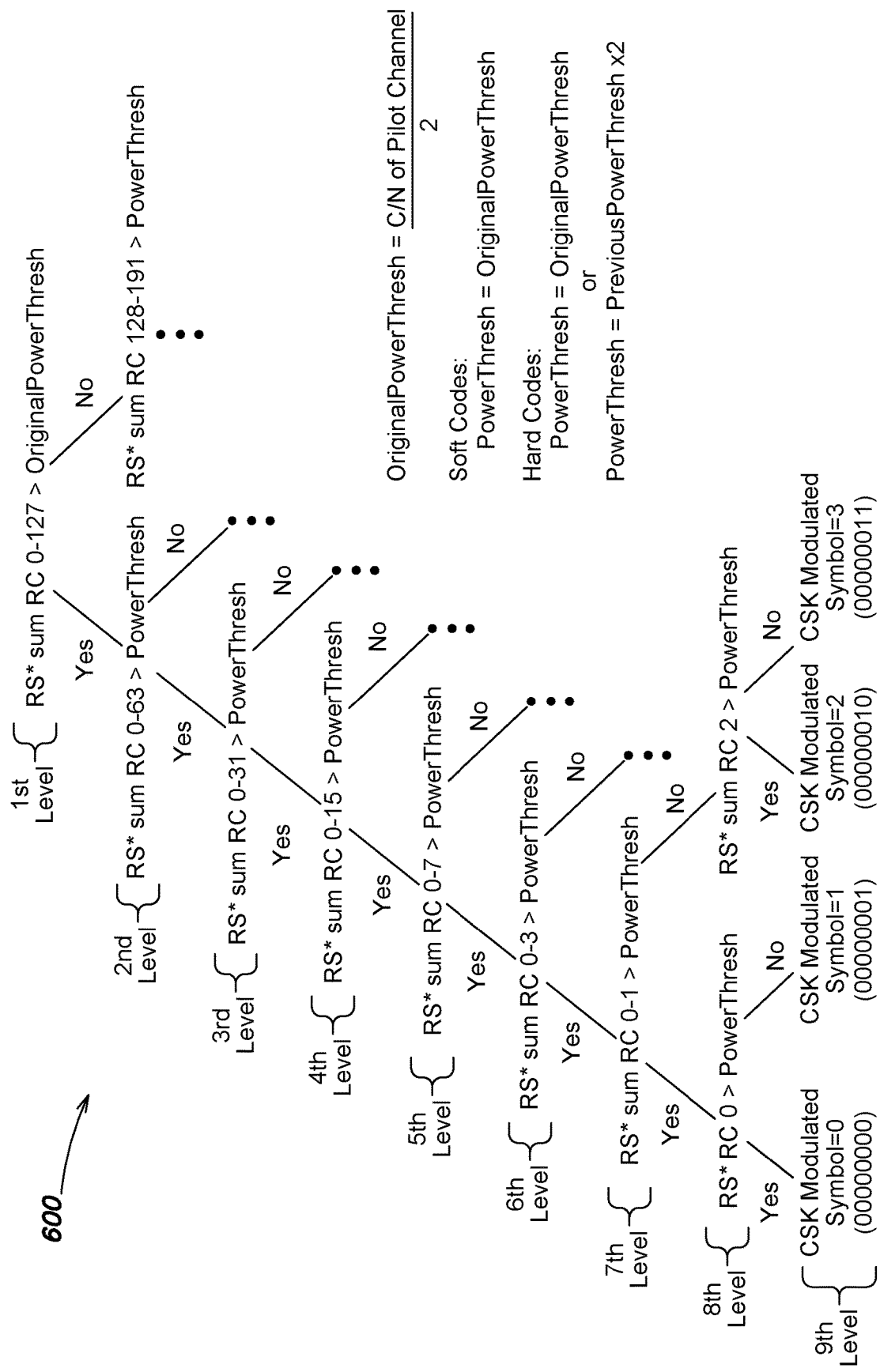
FIG. 6 depicts a binary search tree using correlation power level values for portions of receiver codes with power detection threshold values to demodulate CSK data in accordance with an illustrative embodiment of the invention.

The procedure continues to step 525 where the CSK demodulation subsystem 135 compares correlation power level values for portions (e.g., halves) of receiver codes with power detection threshold values to demodulate the CSK data. Specifically, and as depicted in FIG. 6, the CSK demodulation subsystem 135 performs a first correlation process, utilizing a correlator of the one or more correlators 140, to correlate the received signal with the combinational PRN code generated for receiver codes 0-127 to produce a first correlation power level value. The CSK demodulation subsystem 135 then compares the first correlation power level value to the power detection threshold value.

If the first correlation power level value is greater than the power detection threshold value, the CSK demodulation subsystem 135 performs additional correlations, utilizing the one or more correlators 140, to correlate the received signal with the combinational PRN codes down the first hierarchy to produce correlation power level values that are compared to power detection threshold values to determine the CSK modulated symbol. The CSK modulated symbol, determined based on the traversal down the first hierarchy, is a particular value from 0-127 and is the demodulated CSK data.

It is noted that if the first correlation power level value is not greater than the power detection threshold value, the CSK demodulation subsystem 135 may test for the presence of the signal by also correlating the received signal with an additional combinational PRN code generated for a second portion (e.g., half) of the receiver codes, e.g., receiver codes 128-255. If the correlation power level value from the second portion is not greater than the power detection threshold value, it may be determined that the signal is lost or not present and the procedure ends at step 535.

If the first correlation power level value is not greater than the power detection threshold value and the signal is determined to be present, the CSK demodulation subsystem 135 performs additional correlations, utilizing the one or more correlators 140, to correlate the received signal with the combinational PRN codes down the second hierarchy to produce correlation power level values that are compared to power detection threshold values to determine the CSK modulated symbol. The CSK modulated symbol, determined based on the traversal down the second hierarchy, is a particular value from 128-255 and is the demodulated CSK data.

FIG. 6 illustrates a binary search tree 600 using correlation power level values for portions of receiver codes with power detection threshold values to demodulate CSK data in accordance with an illustrative embodiment of the invention. Specifically, the CSK demodulation subsystem 135 utilizes a correlator of the one or more correlators 140 to correlate the received signal with the first combinational PRN code generated for receiver codes 0-127 to produce the first correlation power level value. The CSK demodulation subsystem 135 then determines if the first correlation power level value is greater than the power detection threshold value. In this example, the first correlation power level value is greater than the power detection threshold.

Therefore, the CSK demodulation subsystem 135 determines that the signal is present and traverses the binary search tree 600 down the first hierarchy to the second level. If the first correlation power level value was not greater than power detection threshold value, the CSK demodulation subsystem 135 would test for the presence of a signal based on the correlation of the received signal with the second portion (e.g., half) of receiver codes, and then traverse the binary search tree 600 down the second hierarchy to the second level.

The CSK demodulation subsystem 135 performs a second correlation process, utilizing the one or more correlators 140, to correlate the received signal with a second combinational PRN code generated for receiver codes 0-63 to produce a second correlation power level value. The CSK demodulation subsystem 135 then determines if the second correlation power level value is greater than the power detection threshold value. If soft codes (e.g., decimal values for combined codes) are being utilized, the power detection threshold is the same for all levels in the binary search tree 600. If hard codes (e.g., 1 bit combined codes) are being utilized, the power detection threshold value may be the same for all levels or may be twice the power detection threshold value of a previous level (i.e., a level above). Therefore, and for the second level, the power detection threshold value is either the original power detection threshold value or two times the original power detection threshold value. In this example, the second correlation power level value is greater than the power detection threshold value of the second level.

The CSK demodulation subsystem 135 continues to traverse the binary search tree 600 down the first hierarchy, based on the comparison of correlation power level values with the power detection threshold values as described above and by performing additional correlation processes, to reach the bottom level (i.e., the ninth level) to determine the CSK modulated symbol. In this example, the CSK demodulation subsystem 135 traverses the first hierarchy and determines that the correlation power level value produced based on the correlation of the received signal with receiver code zero is not greater than the power detection threshold value. As such, the CSK modulated symbol is determined to be one. Therefore, the CSK demodulation subsystem 135 determines that the 8-bit symbol represented by Code 1 modulated by CSK is 00000001 (i.e., a binary representation of 1). Advantageously, the inventive system and method utilizes a total of N correlation processes to demodulate the CSK data when the L6 signal is a L61 signal.

From step 525, the procedure may continue to step 520 where the GNSS receiver 120 receives additional signals and demodulates the CSK data from 250 consecutive L6 4 ms signal sample sets, in the manner described above, to determine the binary value of an entire L6 message that is 2000 bits. Specifically, the GNSS receiver 120 may utilize the generated combinational PRN codes, stored in memory 130, every 4 ms to demodulate the CSK data from 250 consecutive L6 signal sample sets in the manner described above.

Alternatively, from step 525, the procedure may continue to step 530 where the one or more processors 125, of the GNSS receiver 120, calculate position utilizing information from the GNSS signals (e.g., the timing of codes and carriers in the GNSS signals) received at the antenna 115 in conjunction with the demodulated CSK data to mitigate errors (e.g., orbit, clock, atmosphere, and/or multipath errors). For example, the one or more processors 125 may utilize the L6 message of 2000 bits and demodulated from the 250 consecutive L6 signals to implement PPP or any of a variety of different accurate positioning techniques, thus resulting in the calculation of decimeter-level or better positioning accuracy as known by those skilled in the art.

The procedure then continues to step 520 where the receiver 120 may receive additional signals, and demodulates the CSK data and determines position in the manner described above. For example, and after one second and demodulating the entirety of the L6 message, the GNSS receiver may receive additional signals and demodulate the CSK data and determine position in the manner described above.

It is noted that utilizing respective halves of the receiver codes is for exemplary purposes only, and it is expressly contemplated that the combinational PRN codes may be generated based on the receiver codes being divided in any of a variety of different ways. For example, a first combinational PRN code may be generated for ¼ of the receiver codes (e.g., receiver codes 0-63) and a second combinational PRN code may be generated for the other ¾ of the receiver codes (e.g., receiver codes 64-255). The CSK demodulation subsystem 135 would then correlate the received signal with the first combinational PRN code that is compared to the power detection threshold value.

If the first correlation power level value is greater than the power detection threshold value, the CSK demodulation subsystem 135 correlates the received signal with combinational PRN codes down a first hierarchy associated with receiver codes 0-63, in the manner described above, to determine the CSK modulated symbol. The CSK modulated symbol, based on the traversal down the first hierarchy, is a particular value from 0-63 (e.g., 00000000-00111111).

If the first correlation power level value is not greater than the power detection threshold value, the CSK demodulation subsystem 135 correlates the received signal with combinational PRN codes down a second hierarchy associated with receiver codes 64-255, in the manner described above, to determine the CSK modulated symbol. The CSK modulated symbol, based on the traversal down the second hierarchy, is a particular value from 64-255 (e.g., 01000000-11111111).

Thus, the CSK demodulation may utilize any of a variety of partitioning algorithms to divide the receiver codes in a hierarchical manner to demodulate the CSK data in the manner described above. For example, such partitioning algorithms may include, but are not limited to, a golden-section schema or any of a variety of different schemes, as known by those skilled in the art.

Figure 7:
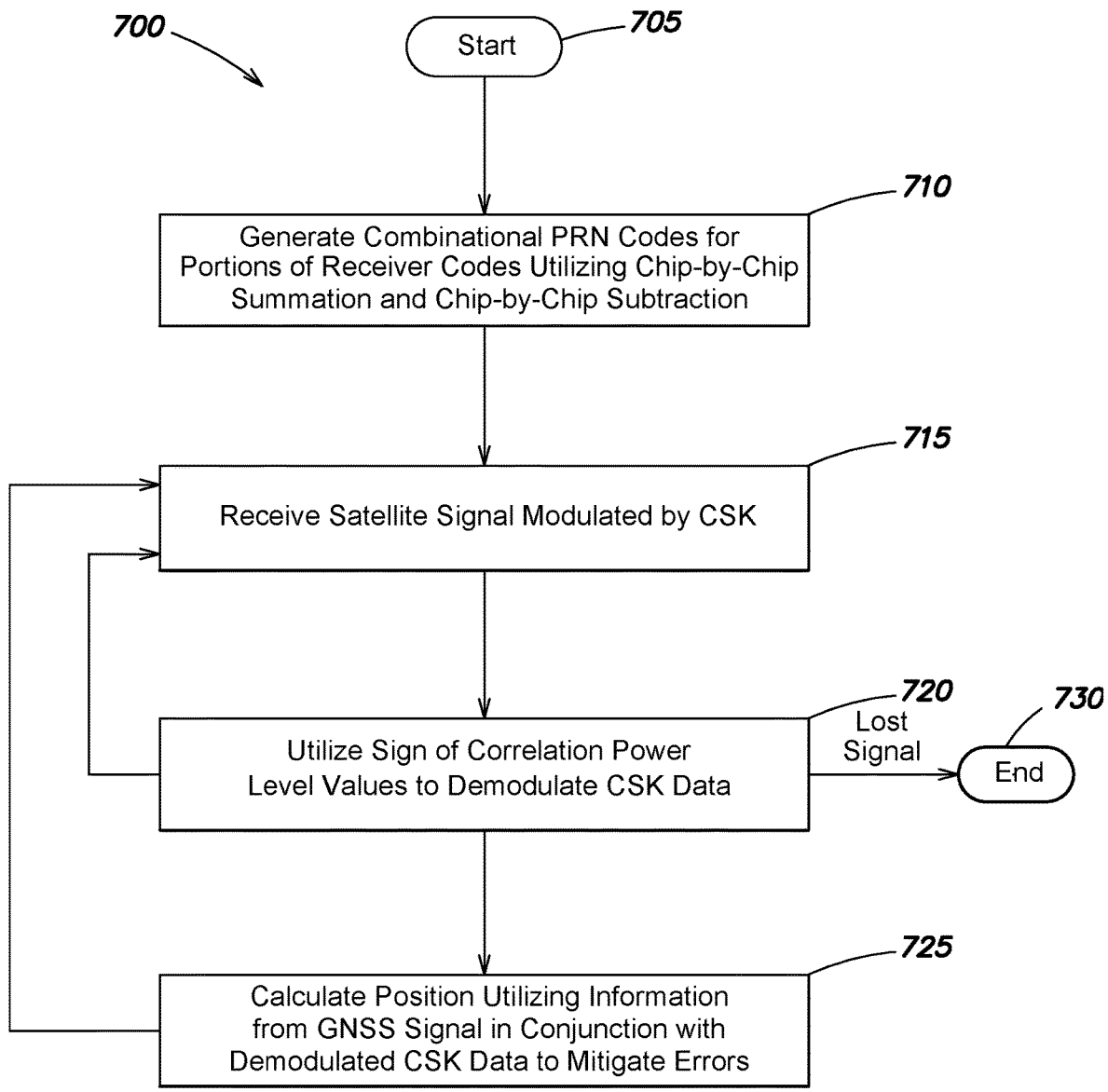
FIG. 7 is an exemplary flow chart for demodulating CSK data utilizing a binary search based on the signs of correlation power level values in accordance with an illustrative embodiment of the invention.

FIG. 7 an exemplary flow chart for demodulating CSK data utilizing a binary search based on the signs of correlation power level values in accordance with an illustrative embodiment of the invention. It should be understood that fewer or additional steps may be performed, and the steps may be performed in a different order.

The procedure 700 starts at step 705 and continues to step 710 where a CSK demodulation subsystem 135 generates combinational PRN codes for portions of the receiver codes utilizing chip-by-chip summation and chip-by-chip subtraction. Specifically, and where N=8, the GNSS receiver 120 may maintain a plurality of different receiver codes, as described above. In addition, a first combinational PRN code may be generated based on a chip-by-chip summation of a first portion (e.g., half) of receiver codes, e.g., receiver codes 0-127, and a chip-by-chip subtraction of a second portion (e.g., half) of receiver codes, e.g., receiver codes 128-255. The CSK demodulation subsystem 135 also performs a chip-by-chip summation and a chip-by-chip subtraction for respective portions (e.g., halves) of receiver codes down a first hierarchy associated with the first portion of the receiver code to produce respective combinational PRN codes. Further, CSK demodulation subsystem 135 performs a chip-by-chip summation and a chip-by-chip subtraction for respective portions (e.g., halves) of receiver codes down a second hierarchy associated with the second portion of the receiver codes to produce respective combinational PRN codes.

Figure 8:
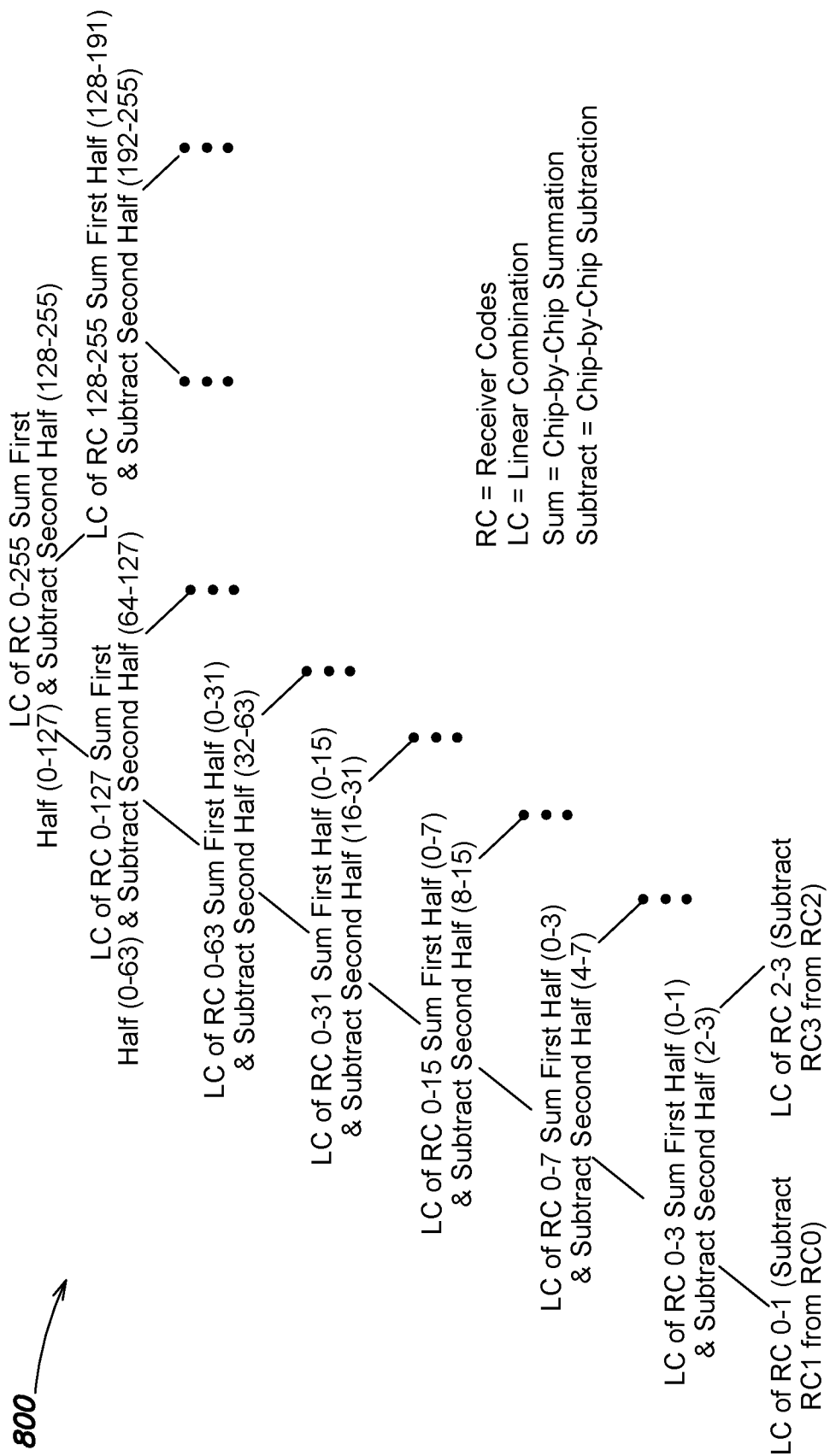
FIG. 8 depicts an exemplary summing tree for the combinational PRN codes generated for portions of receiver codes utilizing chip-by-chip summations and subtractions in accordance with an illustrative embodiment of the invention.

FIG. 8 depicts an exemplary summing tree for the combinational PRN codes generated for portions of receiver codes utilizing chip-by-chip summations and subtractions in accordance with an illustrative embodiment of the invention. Specifically, a first combinational PRN code may be generated for receiver codes 0-255 based on a chip-by-chip summation of receiver codes 0-127 and a chip-by-chip subtraction of receiver codes 128-255. Furthermore, a second combinational PRN code, for receiver codes 0-127 and down a first hierarchy, is generated based on a chip-by-chip summation of receiver codes 0-63 and a chip-by-chip subtraction of receiver codes 64-127. In addition, a third combinational PRN code, for receiver codes 128-255 and down a second hierarchy, is generated based on chip-by-chip summation of receiver codes 128-191 and a chip-by-chip subtraction of receiver codes 192-255. Additional combinational PRN codes are generated down the first hierarchy and the second hierarchy in a similar manner and as depicted in FIG. 8.

The procedure continues to step 715 where a GNSS receiver 120, at a client device 105, receives a satellite signal that is modulated by CSK. The satellite signal may be an L6 signal that includes Code 1 of 10230 chips that is modulated by CSK to represent an N bit symbol. If the L6 signal is an L61 signal, it may also include Code 2 (e.g., pilot channel). If the L6 signal is an L62 signal, it may include an additional data channel. As such, an entire L6 navigation message of 2000 bits can be transmitted from the GNSS satellite 110 to the GNSS receiver 120 in 1 second. For this example, let it be assumed that the N bit symbol where N=8, i.e., the CSK modulated symbol, is 00000000 (i.e., a binary representation of 0).

Figure 9:
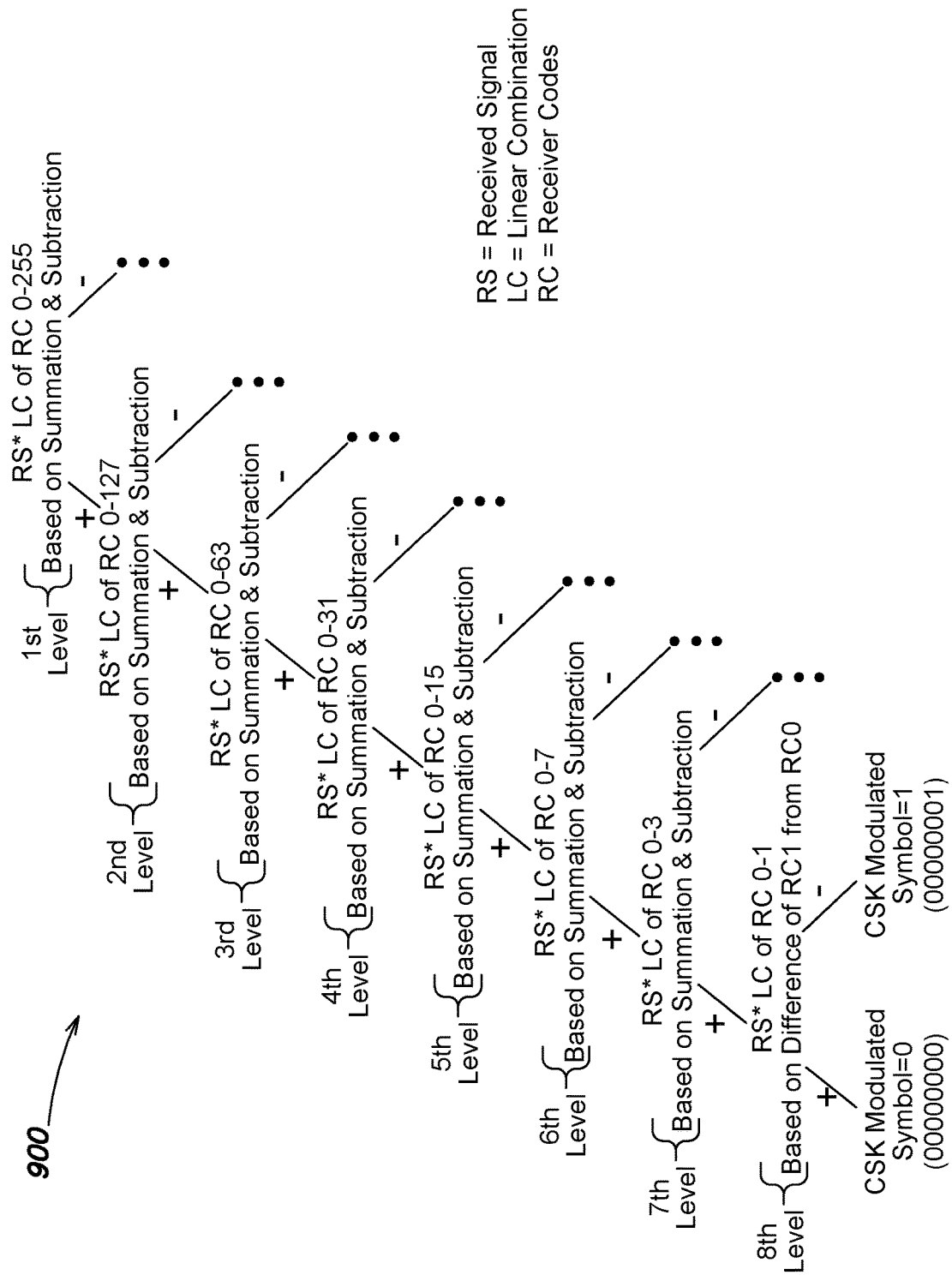
FIG. 9 depicts a binary search tree using the signs of correlation power level values to demodulate CSK data in accordance with an illustrative embodiment of the invention.

The procedure continues to step 720 where the CSK demodulation subsystem 135 utilizes the signs (e.g., positive or negative) of correlation power level values to demodulate the CSK data. Specifically, and as depicted in FIG. 9, the CSK demodulation subsystem 135 correlates, utilizing a correlator of the one or more correlators 140, the received signal with the first combinational PRN code to produce a first correlation power level value. It is noted that the CSK demodulation subsystem 135 may first compare an absolute value of the first correlation power level value to a threshold value to determine if a signal is present. If the absolute value of the first correlation power level value is not greater than the threshold value, the signal is determined to be lost or not present and the procedure ends at 730. It is noted that the threshold value, may, for example, be set by a user or determined in any of a variety of different ways.

If the signal is determined to be present, the CSK demodulation subsystem 135 determines if the correlation power level value is positive (i.e., +) or negative (i.e., −). If the correlation power is positive, the CSK demodulation subsystem 135 correlates the received signal, utilizing a correlator of the one or more correlators 140, with the combinational PRN codes down the first hierarchy to produce correlation power level values. The signs (e.g., positive or negative) of the produced correlation power level values based on the traversal down the first hierarchy are utilized to determine the CSK modulated symbol. The CSK modulated symbol, based on the traversal down the first hierarchy, is a particular value from 0-127 (e.g., 00000000-01111111) and is the demodulated CSK data.

If the correlation power is negative, the CSK demodulation subsystem 135 correlates the received signal, utilizing a correlator of the one or more correlators 140, with the combinational PRN codes down the second hierarchy to produce correlation power level values. The signs (e.g., positive or negative) of the produced correlation power level values based on the traversal down the second hierarchy are utilized to determine the CSK modulated symbol. The CSK modulated symbol, based on the traversal down the second hierarchy, is a particular value from 128-255 (e.g., 10000000-11111111) and is the demodulated CSK data.

FIG. 9 depicts a binary search tree using the signs of correlation power level values to demodulate CSK data in accordance with an illustrative embodiment of the invention. Specifically, the CSK demodulation subsystem 135 utilizes a correlator of the one or more correlators 140 to correlate the received signal with the first combinational PRN code for receiver codes 0-255 to produce the first correlation power level value. The first combinational PRN code is based on a chip-by-chip summation of receiver codes 0-127 and a chip by-chip subtraction of receiver codes 128-255.

The CSK demodulation subsystem 135 then, after confirming the presence of a signal, determines if the first correlation power level value is positive or negative. In this example, the first correlation power level value is positive.

Therefore, the CSK demodulation subsystem 135 traverses the binary search tree 900 down the first hierarchy to the second level. If the first correlation power level value was negative, the CSK demodulation subsystem 135 would traverse the binary search tree 900 down the second hierarchy, associated with receiver codes 128-255, to the second level.

The CSK demodulation subsystem then performs a second correlation process, utilizing a correlator of the one or more correlators 140, to correlate the received signal with a second combinational PRN code generated for receive codes 0-127 to produce a second correlation power level value. The second combinational PRN code is based on a chip-by-chip summation of receiver codes 0-63 and a chip by-chip subtraction of receiver codes 64-127.

The CSK demodulation subsystem then determines if the second correlation power level value is positive or negative. In this example, the second correlation power level value is positive. The CSK demodulation subsystem 135 continues to traverse the binary search tree 900 down the first hierarchy based on the signs (e.g., positive or negative) of the produced correlation power level values utilizing additional correlation processes, to reach the bottom level (i.e., the ninth level) to determine the CSK modulated symbol. In this example, the CSK demodulation subsystem 135 traverses the first hierarchy and determines that the correlation of the received signal and the combinational PRN code, generated based on a chip-by-chip subtraction of receiver code one from receiver code zero, produces a positive correlation power level value. As such, the CSK modulated symbol is determined to be zero. Therefore, the CSK demodulation subsystem 135 determines that the 8-bit symbol represented by Code 1 modulated by CSK is 00000000 (i.e., a binary representation of 0).

Advantageously, the inventive system and method utilizes N correlation processes, e.g., eight correlation processes, to demodulate the CSK data.

From step 720, the procedure may continue to step 715 where the GNSS receiver 120 receives additional signals and demodulates the CSK data from 250 consecutive L6 4 ms signal sample sets, in the manner described above, to determine the binary value of an entire L6 message that is 2000 bits. Specifically, the GNSS receiver 120 may utilize the generated combinational PRN codes, stored in memory 130, every 4 ms to demodulate the CSK data from 250 consecutive L6 signal sample sets in the manner described above.

Alternatively, from step 720, the procedure may continue to step 725 where the one or more processors 125, of the GNSS receiver 120, calculate position utilizing information from the GNSS signals (e.g., the timing of codes and carriers in the GNSS signals) received at the antenna 115 in conjunction with the demodulated CSK data to mitigate errors (e.g., orbit, clock, atmosphere, and/or multipath errors). For example, the one or more processors 125 may utilize the L6 message of 2000 bits and demodulated from the 250 consecutive L6 signals to implement PPP or any of a variety of different accurate positioning techniques, thus resulting in the calculation of decimeter-level or better positioning accuracy as known by those skilled in the art.

The procedure then continues to step 715 where the receiver 120 may receive additional signals, and demodulates the CSK data and determines position in the manner described above. For example, and after one second and demodulating the entirety of the L6 message, the GNSS receiver may receive additional signals and demodulate the CSK data and determine position in the manner described above.

FIGS. 8 and 9 depict performing a chip-by-chip summation of the first half of the receiver codes and a chip-by-chip subtraction of the second half of receiver codes to generate the combinational PRN codes. However, it is expressly contemplated that the systems and methods described herein may perform a chip-by-chip subtraction of the first half of the receiver codes and a chip-by-chip summation of the second half of receiver codes to generate the combinational PRN codes. For example, the CSK demodulation subsystem 135 may perform a chip-by-chip subtraction of receiver codes 0-127 and a chip-by-chip summation of receiver codes 128-255 to generate the first combinational PRN Code for receiver codes 0-255. The CSK demodulation subsystem 135 would then traverse the first hierarchy if the first correlation power value is negative and traverse the second hierarchy if the first correlation power value is positive.

In addition, it is noted that utilizing respective halves of the receiver codes is for exemplary purposes only, and it is expressly contemplated that the combinational PRN codes may be generated based on the receiver codes being divided in any of a variety of different ways. For example, a first combinational PRN code may be generated based on a chip-by-chip summation of ¼ of the receiver codes (e.g., receiver codes 0-63) and a chip-by-chip subtraction of the other ¾ of the receiver codes (e.g., receiver codes 64-255). The CSK demodulation subsystem 135 would then correlate the received signal with the first combinational PRN code to produce a first correlation power level value.

If the first correlation power level value is positive, the CSK demodulation subsystem 135 correlates the received signal with combinational PRN codes down a first hierarchy associated with receiver codes 0-63, in the manner described above, to determine the CSK modulated symbol. The CSK modulated symbol, based on the traversal down the first hierarchy, is a particular value from 0-63 (e.g., 00000000-00111111). If the first correlation power level value is negative, the CSK demodulation subsystem 135 correlates the received signal with combinational PRN codes down a second hierarchy associated with receiver codes 64-255, in the manner described above, to determine the CSK modulated symbol. The CSK modulated symbol, based on the traversal down the second hierarchy, is a particular value from 64-255 (e.g., 01000000-11111111).

Thus, the CSK demodulation may utilize any of a variety of partitioning algorithms to divide the receiver codes in a hierarchical manner to demodulate the CSK data in the manner described above. For example, such partitioning algorithms may include, but are not limited to, a golden-section schema or any of a variety of different schemes, as known by those skilled in the art.

The foregoing description described certain example embodiments. It will be apparent, however, that other variations and modifications may be made to the described embodiments, with the attainment of some or all of their advantages. For example, although the CSK demodulation subsystem 135 is depicted as being within the GNSS receiver 120, it is expressly contemplated that the CSK demodulation subsystem 135 may be a separate component of the client device 105 and may be executed by the processing capabilities of the client device 105. In addition, although reference is made to demodulating an 8-bit symbol and the fundamental PRN code being shifted various chips to the left, it is expressly contemplated that the symbol may be any number of bits and the fundamental PRN code may be shifted various chips to the right. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. An apparatus comprising:
    a processor;
    a demodulation subsystem executed by the processor and configured to:
        receive a modulated signal representing a symbol,
        perform a chip-by-chip linear combination of a first portion of a plurality of receiver codes to generate a first combinational code, wherein each of the plurality of receiver codes is a different shift in chips to a predetermined code,
        perform a chip-by-chip linear combination of a second portion of the plurality of receiver codes to generate a second combinational code,
        correlate the modulated signal with the first combinational code to produce a first power correlation value and correlate the modulated signal with the second combinational code to produce a second power correlation value;
        traverse, in response to the first correlation power level value being greater than the second correlation power level value, a first hierarchy associated with the first portion of the plurality of receiver codes to determine the symbol, and
        traverse, in response to the first correlation power level value not being greater than the second correlation power level value, a second hierarchy associated with the second portion of the plurality of receiver codes to determine the symbol.

2. The apparatus of claim 1, wherein the predetermined code is a pseudorandom noise (PRN) code.

3. The apparatus of claim 1, wherein the modulated signal is received from a Global Navigation Satellite Signal (GNSS) satellite associated with a Quasi-Zenith Satellite System (QZSS).

4. The apparatus of claim 1, wherein the symbol is an 8-bit binary value and the symbol is associated with an L6 message of 2000 bits.

5. The apparatus of claim 1, wherein each chip of the first combinational code is multiple bits or a single bit.

6. The apparatus of claim 1, wherein the symbol is a first value from 0 to 127 based on the traversal of the first hierarchy and the symbol is a second value from 128 to 255 based on the traversal of the second hierarchy.

7. The apparatus of claim 1, wherein a total of 16 correlation processes are utilized to correlate the modulated signal with a plurality of combinational codes.

* * * * *